OR 3,446,967

May 27, 1969 J. S. PALFREEMAN 3,446,967

APPARATUS FOR REVERSING THE SEQUENCE OF PULSES IN A PULSE GROUP

Filed Oct. 6, 1965

INVENTOR.
JOHN S. PALFREEMAN

BY

AGENT

United States Patent Office 3,446,967
Patented May 27, 1969

3,446,967

APPARATUS FOR REVERSING THE SEQUENCE OF PULSES IN A PULSE GROUP

John Siegfried Palfreeman, Brockham Betchworth, England, assignor, by mesne assignments, to U.S. Philips Corporation, New York, N.Y., a corporation of Delaware Filed Oct. 6, 1965, Ser. No. 493,402
Claims priority, application Great Britain, Oct. 6, 1964, 40,713/64
Int. Cl. H04b 9/00
U.S. Cl. 250—199 4 Claims

ABSTRACT OF THE DISCLOSURE

A device for reversing the sequence of pulses in a pulse group in which a group of compression waves corresponding to the pulse group and moving through the medium of a delay line modulator is imaged into a second modulator and optically reduced in order to move through the second modulator at a rate lower than the propagation velocity thereof. When the entire image is imaged in the second modulator a single compression wave generated behind the image in the second modulator and moving in the same direction as, and at a greater velocity than the image in the second modulator, passes through the image. The resultant light pattern corresponding to an inverted form of the original signal is then photoelectrically reconverted into an electrical signal.

The invention relates to apparatus for processing electrical signals representing a phenomenon and which have the form of discrete groups of signals separated by time intervals and is particularly concerned with apparatus for reversing the sequence of the individual signals in a group. Reversal of the sequence of individual pulses of a signal group is exemplified by, for example, a signal input group comprising signals ABC . . . XYZ appearing at the output of the apparatus as a signal group ZYX . . . CBA. Pulse sequence reversing devices are commonly used in the digital computer art as buffers.

The invention utilizes the fact that if a sound wave consisting of alternate layers of compression and rarefaction passes through a transparent solid or liquid medium the changes in density caused by the wave produces corresponding changes in the refractive index of the medium and light passing through the medium in a direction at right angles to the direction of the acoustic wave will be affected by the wave in two ways:

(a) The medium will act as a transmission diffraction grating;

(b) The polarization of the light will be modified. Similar effects are produced by a shear wave travelling through the medium.

Either of the above noted optical effects can be used in a practical apparatus and the presence and characteristics of the chosen optical effect can be determined by instruments responsive to the transmitted light for reproducing the electrical equivalent of the initial sound wave with, if desired, a time delay.

Apparatus of this general character, which for the purposes of this specification will be termed "a delay line modulator" is described in more detail in the book "Ultrasonic Delay Lines" by C. F. Brocklesby, J. S. Palfreeman and R. W. Gibson published by Iliffe Books Ltd. 1963.

According to the invention apparatus for processing electrical signals comprises means for applying a discrete group of electrical signals to a first delay line modulator, optical means for imaging the travelling optical image provided by the modulator on a second delay line modulator, means for applying an interrogating pulse to said second modulator and means for re-converting the optical image output of the said second modulator, resulting from the interrogation into a reversed form of the input electrical signal packet.

Other features of the invention will be apparent from the following description which is given by way of example only of one convenient embodiment with reference to the drawings in which.

Figure 1:
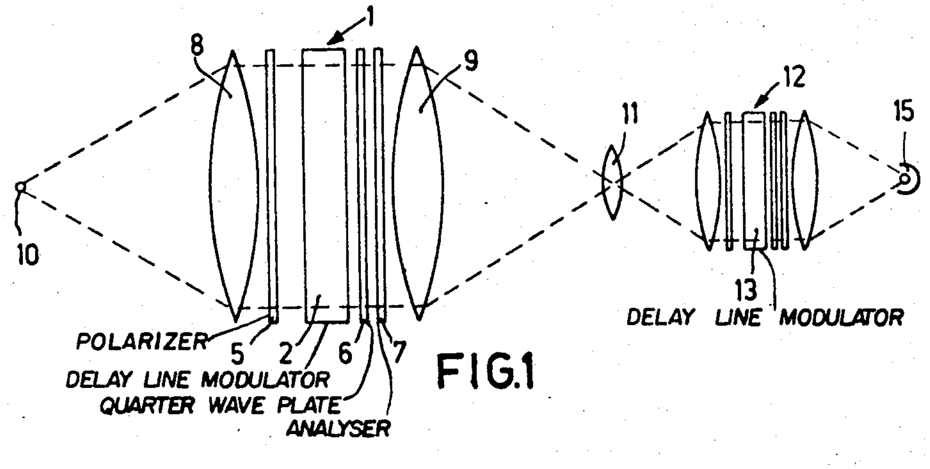
FIG. 1 shows diagrammatically a signal reversal apparatus employing a pair of delay line modulators.
Figure 2:
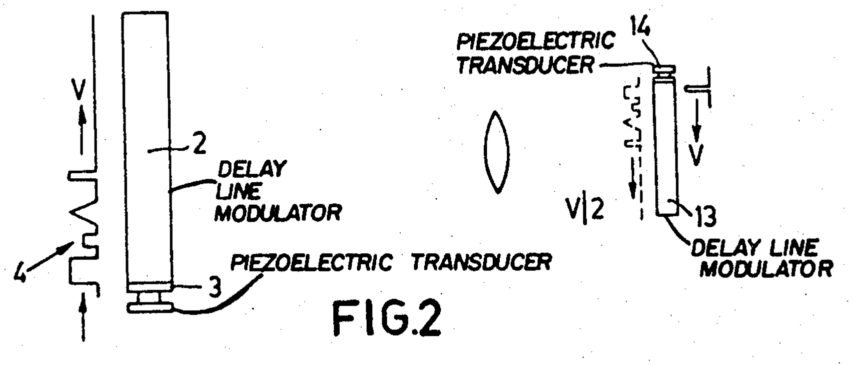
FIG. 2 is a diagram showing the directions of signals in the delay lines.

Referring now to FIGURES 1 and 2 a first delay line modulator 1 comprises a photoelastic delay line 2 having at one end (FIG. 2) a piezoelectric transducer 3 to enable an electrical signal group 4 to be introduced into the delay line in the form of an acoustic wave. The delay line modulator, which has a polarizer 5, a quarter wave plate 6 and an analyser 7 is bounded by optical elements 8 and 9. A light source 10 is arranged to illuminate the whole length of the delay line 2. The travelling optical image emerging from the modulator, due to the passage of the acoustic signal group 4 along the delay line 2, is imaged by a lens or lens combination 11 on a second delay line modulator 12. The optical arrangements are such that the travelling light pattern produced by the delay line 2 is optically reduced by a factor of two to one at the delay line 13 (FIG. 2) of the delay line modulator 12.

Figure 3:
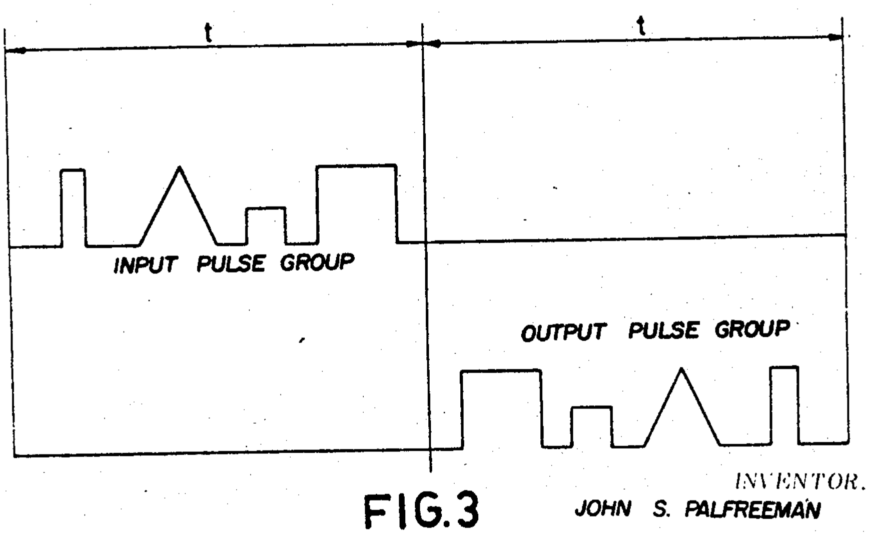
FIG. 3 is a diagrammatic representation of the reversal of a signal group.

It will be clear, that as (in FIG. 2) the acoustic signal wave travels up the delay line 2 its reduced optical image counterpart travels down the delay line 13. At the upper end of this latter delay line a second piezoelectric transducer 14 is arranged to provide an acoustic interrogating pulse of narrow width. The interrogating pulse commences its travel along the delay line 13 as soon as the whole optical signal group has become imaged on the line 13. The delay line 13 is arranged to be at least twice as long as the lengths of the optical signal group so that as this group travels along the line it is overtaken by the interrogating pulse so that the optical signal emerging from the delay line modulator 12 is a reversed image of the input signal applied to the delay line 2, but is otherwise undistorted. This reversal optical signal is re-converted into an electrical signal by, for example, a photo-multiplier tube 15 (FIG. 1). FIG. 3 shows, reading from left to right, the input signal group and its reversed image appearing at the output of the apparatus. Naturally the reversed output is delayed in time with respect to the input signal.

It will be appreciated that if the optical reduction is greater or less than two to one then it is possible to derive from the output of the apparatus a reversed signal which is either stretched or compressed in time relative to the input signal.

The invention is not limited to the exact arrangement above described since changes may be made within the scope of the appended claims to suit particular circumstances as they arise in practice.

What is claimed is:

1. Apparatus for reversing the sequence of electrical pulses within a pulse group, which comprises a first delay line modulator containing a compression wave propagation medium of first given propagation velocity, means for transducing said pulse group into a group of moving compression waves in the medium of said first modulator, a second delay line modulator containing a compression wave propagation medium of second propagation velocity, means for imaging said moving group of compression waves within the medium of said second modulator, and means for interrogating said second modulator in the same direction as said moving image within the medium of said second modulator and at a greater velocity than the velocity of said image in the medium of said second modulator, thereby to read out said pulses in the reverse order of introduction of said pulses into said first modulator.

2. Apparatus as claimed in claim 1 wherein said interrogating means comprises means for generating a compression wave moving in the medium of said second modulator in the same direction as said moving image in the medium of said second modulator and at a greater velocity than said moving image in the medium of said second modulator, and photoelectric means responsive to said image and said compression wave in the medium of said second modulator for producing an electrical signal having an amplitude corresponding to the part of the image intersected by said compression wave in said second modulator.

3. Apparatus for reversing the sequence of electrical pulses within a pulse group, which comprises a first delay line modulator having a compression wave propagation medium of first given propagation velocity, means for transducing said electrical pulse group into a group of moving compression waves in the medium of said first modulator, a second delay line modulator having a compression wave propagation medium of second given propagation velocity, means for projecting an image of said moving group of compression waves into the medium of said second modulator, means intermediate said projection means and said second modulator for reducing the size and speed of said image below the propagation velocity of said second modulator, means responsive to an interrogation pulse for generating a compression wave moving in the medium of said second modulator in the same direction as said image thereby to intersect the image of said pulse group in the reverse order of the generation of said pulses in said pulse group, and photoelectric means responsive to said image and said compression wave in the medium of said second modulator for producing an electrical signal having an amplitude corresponding to the part of the image intersected by the compression wave in said second modulator.

4. Apparatus as claimed in claim 3 wherein said image and speed reducing means decreases the speed of said image in the medium of said second modulator to one-half the propagation velocity of said medium in said second modulator, thereby to permit said compression wave in the medium of said second modulator to pass through each pulse of said pulse group image at a rate equal to the generation of each said pulse in said pulse group and in the reverse order of the generation of said pulse group.

References Cited

UNITED STATES PATENTS

| | | | |
|---|---|---|---|
| 2,797,619 | 7/1957 | Rosenthal | 350—161 |
| 3,088,113 | 4/1963 | Rosenthal | 350—161 |
| 3,235,813 | 2/1966 | Kogelnik. | |

ROBERT L. GRIFFIN, *Primary Examiner.*

ALBERT J. MAYER, *Assistant Examiner.*

U.S. Cl. X.R.

350—161